US008906496B2

(12) United States Patent
Maniwa

(10) Patent No.: US 8,906,496 B2
(45) Date of Patent: Dec. 9, 2014

(54) SLIDING MEMBER AND IMAGE-FIXING DEVICE

(75) Inventor: Takashi Maniwa, Tokyo (JP)

(73) Assignee: W. L. Grove & Associates, Co., Ltd., Tokyo (JP)

( * ) Notice: Subject to any disclaimer, the term of this patent is extended or adjusted under 35 U.S.C. 154(b) by 560 days.

(21) Appl. No.: 13/256,682

(22) PCT Filed: Mar. 16, 2010

(86) PCT No.: PCT/JP2010/054454

§ 371 (c)(1), (2), (4) Date: Sep. 12, 2012

(87) PCT Pub. No.: WO2010/107030

PCT Pub. Date: Sep. 23, 2010

(65) Prior Publication Data

US 2013/0034720 A1 Feb. 7, 2013

(30) Foreign Application Priority Data

Mar. 18, 2009 (JP) ................................ 2009-066110

(51) Int. Cl.
*B32B 3/26* (2006.01)
*B32B 27/12* (2006.01)
*G03G 15/20* (2006.01)

(52) U.S. Cl.
CPC .................................. *G03G 15/2075* (2013.01)
USPC .................. 428/316.6; 428/319.3; 428/319.7; 428/337; 442/97

(58) Field of Classification Search
USPC .................................. 428/316.6, 337; 442/97
See application file for complete search history.

(56) References Cited

U.S. PATENT DOCUMENTS 4,559,248 A * 12/1985 Sumiyoshi et al. ............... 442/5
6,517,919 B1* 2/2003 Griffin ......................... 428/36.1
2006/0179812 A1* 8/2006 Clough et al. .................. 57/210
2008/0032576 A1* 2/2008 Kelmartin et al. .............. 442/88

FOREIGN PATENT DOCUMENTS

JP 2001-228731 8/2001
JP 2003-191389 7/2003
JP 2003-292389 10/2003
JP 2004-29607 1/2004
JP 2004-38075 2/2004
JP 2005-321462 11/2005
JP 2007-102413 4/2007

OTHER PUBLICATIONS

Translation of JP 2004-029607, Koyama et al., "Image Forming and Recording Device," Jan. 20, 2004, 11 pages.*
Translation of JP 2003-191389, Norieda et al., "Sheet-Like Sliding Material," Jul. 8, 2003, 10 pages.*
International Search Report from PCT/JP2010/054454 (2 pages).

* cited by examiner

*Primary Examiner* — Hai Vo
(74) *Attorney, Agent, or Firm* — Amy L. Miller

(57) ABSTRACT

An object is to provide a sliding member having improved lubricant retention capacity without deteriorating the strength of a woven fabric. The sliding member includes: a fabric woven with a yarn containing a fiber bundle of fluororesin; and a lubricant attached to the fabric. In the sliding member, the fluororesin may be polytetrafluoroethylene (e.g., expanded polytetrafluoroethylene). An oil may be used as the lubricant. The sliding member can be used in an image-fixing device.

6 Claims, 4 Drawing Sheets

SLIDING MEMBER AND IMAGE-FIXING DEVICE

TECHNICAL FIELD

The present invention relates to a sliding member used in sliding portions of machine parts. More particularly, it relates to a sheet-like sliding member placed on sliding surfaces of machine parts and used together with a liquid lubricant such as an oil. The sliding member is suitable for use in image-fixing devices such as copiers, printers, and fax machines.

BACKGROUND ART

For example, in a copier, a drum-shaped photoreceptor is uniformly charged and then exposed to light controlled on the basis of image information to form an electrostatic latent image (toner) on the photoreceptor, and using an image-fixing device, the toner is transferred in an unfixed state to a recording medium such as a piece of paper, and then fixed to the recording medium by heating and pressurization.

For example, Patent Document 1 discloses an image-fixing device including: a pressure roller rotatably provided; and a cylindrical endless belt rotatably provided, which is pressed by the pressure roller. A pressure member is provided inside the endless belt so as to press the endless belt toward the pressure roller side. A porous resin member (sliding member) containing a lubricant is provided between the pressure member and the endless belt, and serves to rotate the endless belt smoothly.

As an example of the material to be used for sliding members, Patent Document 2 discloses the use of a fabric woven with a porous yarn. In Patent Document 2, there are used porous PTFE fibers produced by an expanding method, and the method disclosed in Patent Document 3 is exemplified as the method of producing the porous PTFE fibers by an expanding method.

Patent Document 3 discloses three methods as the main methods of obtaining a PTFE yarn-like product. That is, the first method is the emulsion spinning method in which a PTFE dispersion, or a composite solution of a PTFE dispersion and a matrix polymer such as alginic acid and viscose, is discharged into a coagulating bath such as an aqueous sulfuric acid solution. The second method is the slit yarn method in which a slit tape of expanded porous PTFE obtained by expanding an extrudate of a PTFE fine powder-containing paste after the removal of an extrusion aid is expanded again into a yarn shape. The third method is the solution spinning method in which a yarn is spun by extruding a solution of PTFE in a perfluorocarbon compound solvent through a spinneret into an inert gas or an inert liquid.

The yarns used in Patent Documents 2 and 3 are so-called single yarns (monofilaments), and the lubricant fed to cause the woven fabric to function as the sliding member is retained in the space between the yarns of the woven fabric.

PRIOR ART DOCUMENTS

Patent Documents

Patent Document 1: Japanese Patent Laid-open Publication No. 2001-228731 (FIG. 1)

Patent Document 2: Japanese Patent Laid-open Publication No. 2003-191389 (e.g., paragraph 0008)

Patent Document 3: Japanese Patent Laid-open Publication No. 07-102413 (e.g., paragraph 0002)

SUMMARY OF THE INVENTION

Problems to be Solved by the Invention

However, during the use of the sliding member, a convex portion on the surface of the sliding member (which convex portion is corresponding to a mountain portion of a yarn) is gradually scraped and smoothed. Consequently, when the fabric disclosed in Patent Document 2 is continuously used, the space between the yarns capable of retaining the lubricant is increased, and therefore, the portions in which the lubricant is retained are eliminated. This leads to an insufficient feed of the lubricant to the portions in which the lubricant is required. For this reason, the frictional resistance of the sliding member (hereinafter also referred to as the "sliding resistance") is increased, and therefore, various problems may become arise, such as a failure due to an increase in the load on the device, an abrasion on the surface of a movable member such as an endless belt, an increase in power consumption, and heat generation. For this reason, it may become necessary to replace the sliding member before the image-fixing device reaches the end of its life.

To increase the lubricant retention capacity, the space between the yarns may possibly be reduced by preparing a woven fabric using a thinner single yarn. In this case, however, there is a problem that the strength of the woven fabric itself may become insufficient. It is considered that when the yarn is thin, each yarn is easy to break, and therefore, the strength is decreased even with the same total fineness (denier number). Further, when the yarn is thin, the irregularities on the surface of the woven fabric become decreased due to abrasion. This increases the area of contact during sliding, and therefore, increases the frictional resistance at a very early stage after the start of use.

The present invention has been completed under the above circumstances, and it is an object of the present invention to provide a sliding member having improved lubricant retention capacity without deteriorating the strength of a woven fabric, and to provide an image-fixing device capable of operating with a low frictional resistance over a long period of time, using the sliding member.

Means of Solving the Problems

The sliding member of the present invention, which can achieve the above object, comprises: a fabric woven with a yarn containing a fiber bundle of fluororesin; and a lubricant attached to the fabric.

In the above sliding member, it is preferred to employ an embodiment in which the fluororesin is polytetrafluoroethylene or an embodiment in which the polytetrafluoroethylene is expanded polytetrafluoroethylene.

In the above sliding member, it is preferred to employ an embodiment in which an oil is used as the lubricant.

In the above sliding member, if necessary, a resin film may be fixed on one side of the fabric, both of which are integrated together, or if necessary, a porous film may be provided on one side or both sides of the fabric or the resin film-integrated fabric.

In the above sliding member, the fiber of fluororesin forming the yarn may desirably be from 10 to 100 denier.

In the above sliding member, the yarn may desirably be a bundle of from 8 to 50 staple fibers of fluororesin.

In the above sliding member, a yarn of from 200 to 1,000 denier, which is composed of a bundle of from 10 to 50 expanded polytetrafluoroethylene fibers of from 30 to 70 denier, may desirably be used as the yarn.

In the above sliding member, the fabric may desirably have a thickness of from 0.1 to 1 mm.

In the above sliding member, the fabric may desirably be a plain-woven fabric, of which at least one of a warp yarn and a weft yarn is a twisted yarn.

In the above sliding member, a silicone oil having a viscosity of from 50 to 3,000 cps may desirably be used as the lubricant.

The image-fixing device of the present invention, which can achieve the above object, comprises the above sliding member.

Effects of the Invention

The present invention makes it possible to provide a sliding member capable of stably feeding a lubricant even over a long period of use, because the lubricant is attached to a fabric woven with a yarn containing a fiber bundle of fluorocarbon resin, so that the lubricant enters between the fibers to give high lubricant retention capacity. Moreover, it has been found that, surprisingly, the present invention does not reduce the strength of the woven fabric itself. This sliding member makes it possible to provide an image-fixing device capable of operating with a low frictional resistance over a long period of time.

MODE FOR CARRYING OUT THE INVENTION

Embodiment 1

Figure 1:
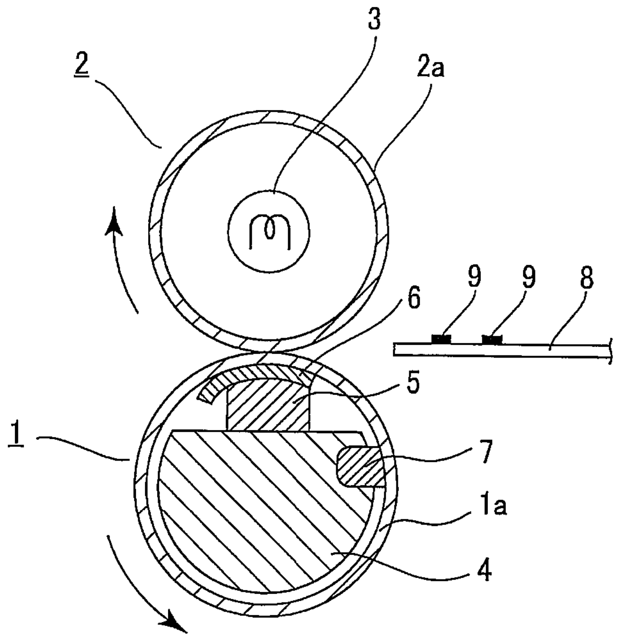
FIG. 1 is a cross-sectional view of an image-fixing device in Embodiment 1 of the present invention.

Based on the drawing, the following will describe an image-fixing device according to Embodiment 1 of the present invention. However, Embodiment 1 is primarily intended to describe an example of use for the sliding member of the present invention, and an image-fixing device using the sliding member of the present invention is not limited to this embodiment. The sliding member of the present invention can be used in any of ordinary image-fixing devices each requiring a sliding member.

FIG. 1 is a cross-sectional view of an image-fixing device using the sliding member of the present invention. In FIG. 1, the image-fixing device has a structure in which a fixing roller 1 and a heating roller 2 are pressed against each other while rotating in the directions of arrows, respectively. A piece of paper 8, to which a toner 9 (unfixed) is attached, is sandwiched between the fixing roller 1 and the heating roller 2, and the toner 9 is fixed by heating and pressurization.

The fixing roller 1 has an endless belt 1*a* and a pressing section 5 formed in the inside thereof. A material having excellent release properties, such as perfluoroalkoxy fluororesin (PFA) and polytetrafluoroethylene resin (PTFE), is formed on the outer surface of the endless belt 1*a*.

A core member 4 is provided in the inside of the endless belt 1*a* rotatably relative to the endless belt 1*a*. The pressing section 5 is fixed to the core member 4, and a sliding member 6 formed of a woven fabric is fixed to the end of the pressing section 5. That is, the sliding member 6 is placed between the pressing section 5 and the inner surface of the endless belt 1*a*, and is fixed to the pressing section 5 but merely pressed against the endless belt 1*a* so as to be slidable. A lubricant is attached to the woven fabric forming the sliding member 6, to improve the sliding properties between the sliding member 6 and the endless belt 1*a*. A detailed description will be given of the sliding member 6 in Embodiment 2 described later.

Further, a lubricant feed member 7 formed of a porous substance impregnated with a lubricant is attached to the core member 4. The lubricant in the lubricant feed member 7 is sequentially fed to the sliding member 6 by the rotation of the endless belt 1*a*.

The heating roller 2 is provided with a cylindrical portion 2*a* (a stainless layer, an elastic layer, and a release layer, in the order from the inside) formed on the periphery thereof. Further, a halogen lamp 3 is provided as a heat source in the inside of the cylindrical portion 2*a*. In this connection, as the constituent material of the elastic layer, there can be mentioned silicone rubbers and fluoro-rubbers.

The description given above is an outline of the image-fixing device using the sliding member of the present invention. Then, the sliding member of the present invention will be described in detail.

Embodiment 2

The following will describe the sliding member according to Embodiment 2 of the present invention. The sliding member of the present invention includes, as described above, a fabric woven with a yarn containing a fiber bundle of fluororesin (hereinafter referred to as the "woven fabric," or simply as the "fabric"), to which woven fabric a lubricant is attached.

(Fluororesin Fibers)

As the fibers of fluororesin, there can be mentioned porous polytetrafluoroethylene (PTFE) fibers, non-porous PTFE fibers, tetrafluoroethylene-perfluoroalkyl vinyl ether copolymer (PFA) fibers, tetrafluoroethylene-hexafluoropropylene copolymer (FEP) fibers, tetrafluoroethylene-ethylene copolymer (ETFE) fibers, polychlorotrifluoroethylene (PCTFE) fibers, chlorotrifluoroethylene-ethylene copolymer (ECTFE) fibers, polyvinylidene fluoride (PVDF) fibers, and polyvinyl fluoride (PVF) fibers. As well as the above, it is possible to use products obtained by appropriately combining these fluororesin fibers with one another; or these fluororesin fibers with other organic fibers (e.g., nylons, polyesters, and aramids) or inorganic fibers. In these fibers, polytetrafluoroethylene may preferably be used from the viewpoint of improving sliding properties and abrasion resistance. Alternatively, expanded polytetrafluoroethylene may preferably be used from the viewpoint of increasing the strength of the fibers.

For example, porous polytetrafluoroethylene is obtained by forming a mixture of a PTFE fine powder and a forming aid, removing the forming aid from the formed product, and then expanding the resulting product at a high temperature and at a high rate, and further, if necessary, baking the resulting product. A fibrous product can be formed by tearing the obtained porous polytetrafluoroethylene into small pieces along the expanding direction.

To maintain the minimum strength, each of the fluororesin fibers may desirably be, for example, not smaller than 10 denier (more preferably not smaller than 20 denier, and still more preferably not smaller than 30 denier). Further, in the present invention, the lubricant enters not only between the bundles of fluororesin fibers but also between the fluororesin fibers. This results in excellent lubricant retention capacity. To exhibit such an effect more effectively, each of the fluororesin fibers may desirably be, for example, not greater than 100 denier (more preferably not greater than 80 denier, and still more preferably not greater than 70 denier).

(Fiber Bundle)

The fiber bundle is a bundle formed by collecting a plurality of (at least two, preferably at least eight, and more preferably at least 15; and at most 100, preferably at most 80, and more preferably at most 50) staple fibers of fluororesin. Examples of the fiber bundle may include those obtained by simply bundling staple fibers, and those obtained by twisting and bundling staple fibers.

Taking into consideration the balance between the fineness of a fiber and the number of fibers included in the fiber bundle, the fiber bundle may preferably be not smaller than 200 denier by bundling expanded fluororesin fibers each being from 10 to 100 denier. Further, the optimal ranges are such that the fiber bundle may be from 200 to 1,000 denier by bundling from 10 to 50 fibers (expanded PTFE fibers) each being from 30 to 70 denier. This results in an excellent balance between the strength and the lubricant retention capacity.

(Woven Fabric)

The woven fabric is a fabric woven with the fiber bundle described above, and its weave is not particularly limited. Examples of the weave may include plain weave, sateen weave, twill weave, leno weave, and mock leno weave. In the present invention, plain weave or sateen weave may be preferred from the viewpoints of abrasion resistance and sliding properties. The woven fabric may preferably have a thickness of from 0.1 to 1 mm, more preferably from 0.2 to 0.5 mm, from the viewpoints of the strength and handling properties of the woven fabric.

In this connection, when the woven fabric in the present invention is formed by plain weave, at least one of the warp yarn and the weft yarn may desirably be a twisted yarn.

(Lubricant)

The lubricant may include oils and greases, and oils may preferably be used from the viewpoint of lubricity. In the case of oils, silicone oils, fluorinated oils, or other oils are used, and fluorinated oils may preferably be used from the viewpoint of performance. When silicone oils are used, modified silicone oils, such as amino-modified silicone oils, dimethylsilicone oils, mercapto-modified silicone oils, and hindered amine oils, may be preferred because of their excellent sliding properties and excellent durabilities. In this case, the silicone oils may preferably have a viscosity (at ordinary temperature) of not smaller than 50 cps (more preferably not smaller than 100 cps, and still more preferably not smaller than 300 cps), and not greater than 3,000 cps (more preferably not greater than 1,000 cps, and still more preferably not greater than 500 cps). When the viscosity is smaller than 50 cps, the evaporation of the silicone oil becomes significant. When the viscosity is greater than 3,000 cps, the sliding resistance is increased, and therefore, it is not possible to obtain the effect of using the lubricant.

(Resin Film)

Alternatively, the sliding member may be obtained by firmly fixing a resin film to one side of the woven fabric (on the pressing section 5 side and on the opposite side of the sliding surface), both of which are integrated together. This resin film is effective for preventing the deformation of the woven fabric. When a resin film is not used, the woven fabric may deform over a long period of use, and may possibly cause various disadvantages. The use of a resin film, however, makes it possible to prevent such disadvantages from occurring. The deformation amount of the woven fabric may vary depending on the material and organization structure of the woven fabric. When the deformation is greater, the effect of using a resin film is more significant. Thus, the use of a resin film provides an excellent temporal stability even when the woven fabric has a relatively great amount of deformation.

As the resin film used in the present invention, there may be used, for example, various porous and non-porous resin films and metal films. Non-porous resin films may preferably be used from the viewpoints of lubricant barrier properties, workability, and cost. The use of a non-porous resin film makes it possible that when a lubricant is retained in the woven fabric used in the present invention, even if the pressing section 5 formed of, for example, a silicone rubber is used underneath the woven fabric, the resin film functions as a barrier layer for the lubricant, and therefore, prevents a phenomenon that the lubricant moistens the pressing section 5 to cause the swelling and deterioration of the pressing section 5. Specific examples of the material used for the resin film may include fluororesins such as PTFE, PFA, FEP, and ETFE; polyethylene terephthalate (PET); polyimide (PI); polyetherimide (PEI); polyethersulfone (PES); polyphenylene sulfide (PPS); polyether ether ketone (PEEK); polyethylene naphthalate (PEN); and liquid crystal polymers (LCP).

(Porous Film)

A porous membrane (porous film) may adhesively be layered on one side (on the sliding surface side) or both sides of the woven fabric or the resin film-integrated woven fabric from the viewpoints of reducing the sliding resistance and improving the abrasion resistance. This porous film is not particularly limited, so long as it can retain a lubricant, and withstands the operating temperature of the sliding member. Various porous fluorocarbon resin films may preferably be used because of their excellent sliding properties. In the present invention, particularly, porous PTFE may preferably be used from the viewpoints of heat resistance, abrasion resistance, sliding properties, and oil retention capacity. The porous film may have a thickness of from 1 to 1,000 μm, preferably from 5 to 150 μm from the viewpoints of the handling properties, strength, and cost of the film. The porous film may preferably have the maximum pore diameter of not smaller than 0.01 μm from the viewpoints of abrasion resistance, sliding properties, and lubricant retention capacity. When the maximum pore diameter is smaller than 0.01 μm, the lubricant retention capacity of the film becomes decreased. The upper limit value of the maximum pore diameter is not particularly limited, so long as the lubricant retention capacity, the abrasion resistance, and the sliding properties are not deteriorated. The porous PTFE film can be produced by any of the heretofore known methods such as expanding, solvent extraction, and casting. An expanded porous PTFE film produced by expanding may particularly preferably be used because of its high strength and excellent abrasion resistance. The method of producing the porous PTFE film by expanding may be any of the heretofore known methods disclosed in, for example, the following publications: Japanese Patent Laid-open Publication Nos. 46-7284, 50-22881, and 03-504876.

EXAMPLES

The present invention will hereinafter be described more specifically by reference to Examples, but the present invention is not limited to these Examples. The present invention can be put into practice after appropriate modifications or variations within a range meeting the gist described above and below, all of which are included in the technical scope of the present invention.

1. Preparation of Samples

As the fiber bundle (yarn) used in Examples of the present invention, a fiber bundle available from W.L. Gore and Associates Co., Ltd. (product number: Y006TO) was used. This fiber bundle was obtained using fibers prepared by tearing expanded porous polytetrafluoroethylene into small pieces in the expanding direction. The torn expanded porous PTFE fibers are 40 denier on average. A fiber bundle (a yarn) of 600 denier was formed by bundling an average of 15 expanded porous PTFE fibers as described above.

In the present Example, a woven fabric having a thickness of 0.35 mm was prepared by plain-weaving this fiber bundle, and 1.2 g of a fluorinated oil was attached to the woven fabric per 100 $cm^2$, so that a sliding member was obtained.

Figure 2:
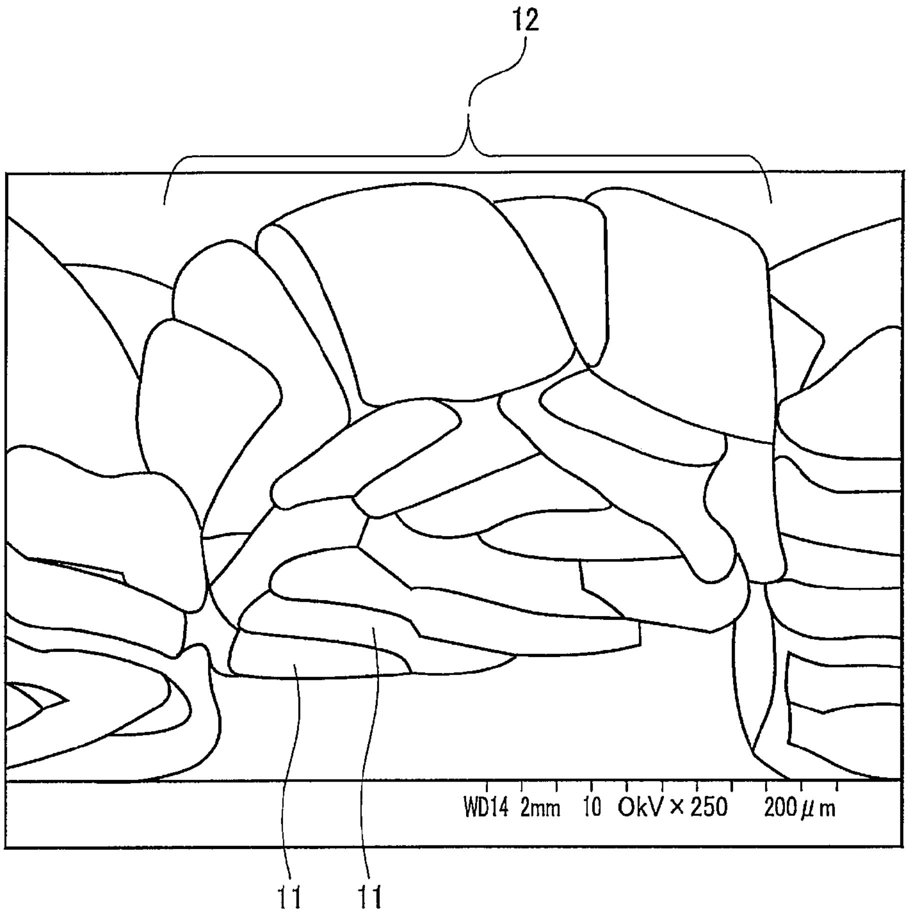
FIG. 2 is a sketch of a microscope observation image of a cross-section of a sliding member in the Example.

The sliding member thus obtained was cut, and its cross section was observed with a scanning electron microscope. However, a high-contrast image was not obtained, and therefore, the observed area was sketched. FIG. 2 shows the sketch. According to FIG. 2, the cross section of each fiber had a flattened shape having a width of about 80 μm and a height of about 7 μm.

2. Measurement of Sliding Resistance

Figure 3:
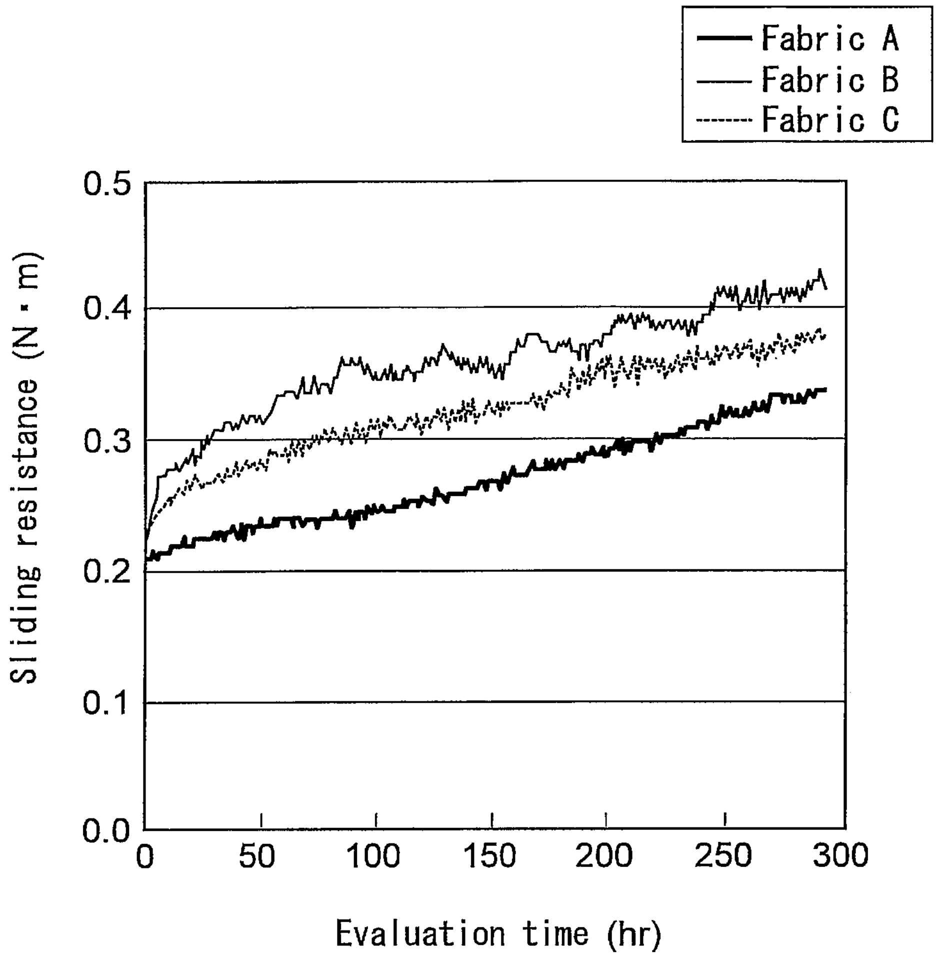
FIG. 3 is a graph showing the relationship between the sliding resistance of each fabric and the measurement time in the Example and Comparative Examples.

The sliding member prepared as described above (hereinafter referred to as the "fabric A") was actually mounted to a fixing unit of a color laser printer available from Fuji Xerox Co., Ltd. (DocuPrint C3530), and the sliding resistance of the sliding member (in the rotation direction) was measured (FIG. 3). For the measurement, the torque for continuously rotating the heating roller 2 of the image fixing device shown in FIG. 1 was measured. A fabric B used for comparison is different from the fabric A in that the fabric B does not use a fiber bundle (yarn), but is woven with a single yarn (monofilament). However, the fabric B is the same as the fabric A in that the constituent material is porous polytetrafluoroethylene, and in the fineness (deniers) of the yarn and the yarn count of the fabric. Further, a fabric C used for comparison is a PTFE-impregnated glass cloth that came with the fixing unit of the image fixing device. The detailed conditions of the sliding resistance measurement test are as described below. In this connection, for each of the fabrics A, B, and C, Fomblin (product name) available from Solvay Solexis K.K. [product number: Y-LVAC 25/6] was used as a lubricant.

Test temperature: 170° C.

Linear speed of paper: 6.7 m/min

Nip pressure: 1.5 MPa

Measurement time: 300 hours

Lubricant: not feed (fed only by the impregnation at the start of the evaluation)

As can be seen from FIG. 3, the fabric A, which was prepared with a bundle of porous polytetrafluoroethylene fibers, maintains lower sliding resistance over a long period of time than the fabrics B and C. In contrast, the fabric B, which was woven with a single yarn (monofilament), has relatively low value of the sliding resistance at the start of the evaluation, because the fabric B has small points of contact with the endless belt. The irregularities of the surface of the woven fabric, however, decrease due to abrasion. This increases the area of contact during sliding, and therefore, increases the sliding resistance at a very early stage after the start of use. The fabric C is more excellent than the fabric B, but is inferior to the fabric A, from the viewpoint of sliding resistance.

3. Strength Evaluation

Figure 4:
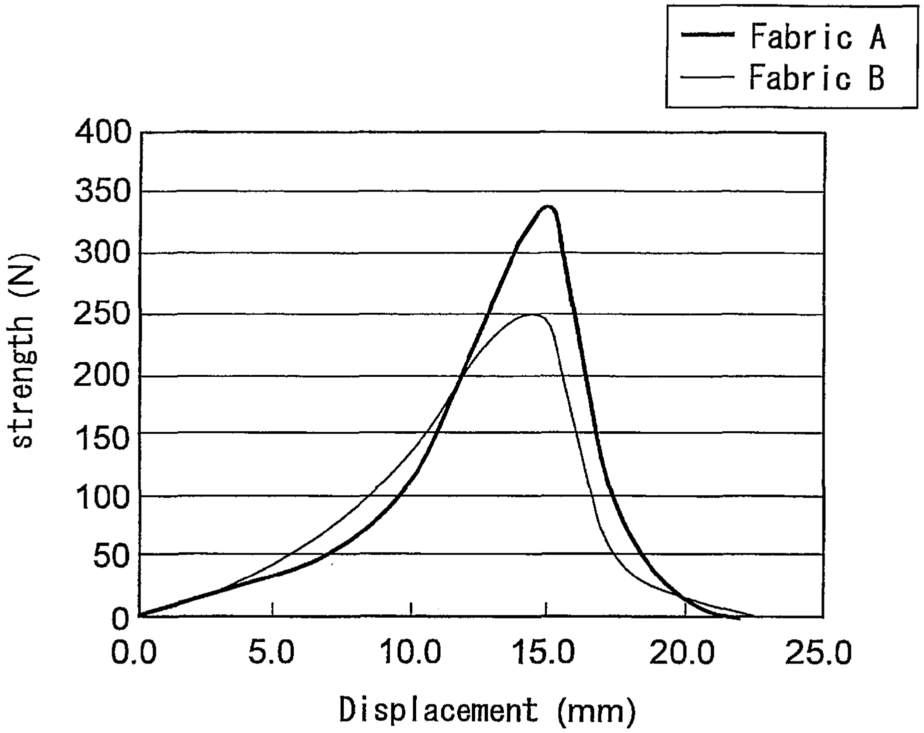
FIG. 4 is a graph showing the relationship between the strength (tensile strength (stress)) and the tensile displacement of each fabric in the Example and Comparative Examples.

Each of the fabrics A and B was formed into a shape of the No. 5 dumbbell of JIS-K7127, and the tensile strength (at a tensile speed of 50 mm/min) of the resulting product was measured in accordance with JIS-K7161. The results are shown in FIG. 4. As can be seen from FIG. 4, it has been confirmed that although the fabric A is formed with thin fibers, the tensile strength of the fabric A does not decrease (on the contrary, the maximum tensile stress increases) as compared with the fabric B.

EXPLANATION OF NUMERALS

1 Fixing roll
1*a* Endless belt
2 Heating roll
2*a* Cylindrical portion
3 Halogen lump
4 Core member
5 Pressing section
6 Sliding member
7 Lubricant-feeding member
8 Paper
9 Toner
11 Fibers
12 Fiber bundle

What is claimed is:

1. A sliding member comprising: a fabric forming a sliding member, wherein the fabric is woven with a yarn containing a bundle of from 8-50 fibers of fluororesin fibers, wherein the fibers of fluororesin forming the yarn is from 10 to 100 denier, and wherein the fluororesin fibers are porous polytetrafluoroethylene (PTFE) fibers; and a lubricant attached to the fabric, wherein a resin film is fixed on one side of the fabric, both of which are integrated together, and wherein a porous film is provided on one side or both sides of the resin film-integrated fabric.

2. The sliding member according to claim 1, wherein the lubricant is an oil.

3. The sliding member according to claim 1, wherein the fabric has a thickness of from 0.1 to 1 mm.

4. The sliding member according to claim 1, wherein the fabric is a plain-woven fabric, of which at least one of a warp yarn and a weft yarn is a twisted yarn.

5. The sliding member according to claim 1, wherein the lubricant is a silicone oil having a viscosity of from 50 to 3,000 cps.

6. An image-fixing device comprising the sliding member according to claim 1 and a belt:

wherein the sliding member is slidably positioned to press against the belt upon relative movement of the belt.

* * * * *

UNITED STATES PATENT AND TRADEMARK OFFICE

CERTIFICATE OF CORRECTION

PATENT NO. : 8,906,496 B2
APPLICATION NO. : 13/256682
DATED : December 9, 2014
INVENTOR(S) : Takashi Maniwa It is certified that error appears in the above-identified patent and that said Letters Patent is hereby corrected as shown below:

On the title page item (73) Assignee:

change "W. L. Grove & Associates, Co. Ltd." to: "W. L. Gore & Associates, Co., Ltd."

Signed and Sealed this
Twenty-eighth Day of April, 2015

Michelle K. Lee

Michelle K. Lee
*Director of the United States Patent and Trademark Office*